United States Patent
Chiu

(10) Patent No.: US 11,972,150 B2
(45) Date of Patent: *Apr. 30, 2024

(54) METHOD AND NON-TRANSITORY COMPUTER-READABLE STORAGE MEDIUM AND APPARATUS FOR PROGRAMMING DATA INTO FLASH MEMORY THROUGH DEDICATED ACCELERATION HARDWARE

(71) Applicant: Silicon Motion, Inc., Zhubei (TW)

(72) Inventor: Shen-Ting Chiu, Miaoli County (TW)

(73) Assignee: SILICON MOTION, INC., Zhubei (TW)

(*) Notice: Subject to any disclaimer, the term of this patent is extended or adjusted under 35 U.S.C. 154(b) by 73 days.

This patent is subject to a terminal disclaimer.

(21) Appl. No.: 17/879,205

(22) Filed: Aug. 2, 2022

(65) Prior Publication Data

US 2023/0099396 A1 Mar. 30, 2023

Related U.S. Application Data

(60) Provisional application No. 63/249,702, filed on Sep. 29, 2021.

(30) Foreign Application Priority Data

Apr. 1, 2022 (CN) .......................... 202210338471.8

(51) Int. Cl.
*G06F 3/06* (2006.01)
(52) U.S. Cl.
CPC .......... *G06F 3/0659* (2013.01); *G06F 3/0619* (2013.01); *G06F 3/0631* (2013.01); *G06F 3/0689* (2013.01)

(58) Field of Classification Search
CPC .... G06F 3/0659; G06F 3/0619; G06F 3/0631; G06F 3/0689
See application file for complete search history.

(56) References Cited

U.S. PATENT DOCUMENTS

2006/0173969 A1* 8/2006 Wilson ................... G06F 21/80
709/215
2011/0302468 A1 12/2011 Lee et al.
(Continued)

FOREIGN PATENT DOCUMENTS

CN 104520932 A 4/2015
CN 105653609 A 6/2016
(Continued)

*Primary Examiner* — Eric T Loonan
(74) *Attorney, Agent, or Firm* — Birch, Stewart, Kolasch & Birch, LLP

(57) ABSTRACT

The invention relates to a method, a non-transitory computer-readable storage medium and an apparatus for programming data into flash memory. The method includes: generating a front-end parameter set, a mid-end parameter set and a back-end parameter set for each data-programming transaction; transmitting the front-end parameter set of each data-programming transaction to a routing engine, thereby enabling the routing engine to drive a host interface (I/F) to obtain from the host side; transmitting the mid-end parameter set of each data-programming transaction to an accelerator, thereby enabling the accelerator to drive the RAID engine to encrypt raw data or generate parity-page data according to multiple pages of the raw data; and transmitting the back-end parameter set of each data-programming transaction to the accelerator, thereby enabling the accelerator to drive a data access engine to program source data into a designated physical address of a flash module.

20 Claims, 8 Drawing Sheets

(56) References Cited

U.S. PATENT DOCUMENTS

| | | | |
|---|---|---|---|
| 2012/0240230 A1 | 9/2012 | Lee | |
| 2013/0297986 A1* | 11/2013 | Cohen | G06F 3/061 |
| | | | 714/763 |
| 2013/0318285 A1 | 11/2013 | Pignatelli | |
| 2014/0258755 A1 | 9/2014 | Stenfort | |
| 2015/0149789 A1* | 5/2015 | Seo | G06F 3/0608 |
| | | | 713/193 |
| 2017/0177270 A1* | 6/2017 | Nakagawa | G06F 3/0688 |
| 2018/0232179 A1 | 8/2018 | Cohen | |
| 2019/0042388 A1 | 2/2019 | Wang et al. | |
| 2019/0171522 A1* | 6/2019 | Chang | G06F 3/061 |
| 2019/0179569 A1* | 6/2019 | Yang | G06F 3/0634 |
| 2020/0057572 A1 | 2/2020 | Lin | |
| 2020/0065190 A1 | 2/2020 | Li | |
| 2020/0081780 A1 | 3/2020 | Li | |
| 2020/0151104 A1 | 5/2020 | Yang | |
| 2020/0326855 A1 | 10/2020 | Wu et al. | |
| 2020/0409554 A1 | 12/2020 | Srimal et al. | |
| 2021/0133096 A1 | 5/2021 | Bae | |

FOREIGN PATENT DOCUMENTS

| | | |
|---|---|---|
| CN | 109308280 A | 2/2019 |
| CN | 109901782 A | 6/2019 |
| CN | 110659230 A | 1/2020 |
| CN | 112905854 A | 6/2021 |
| GB | 2569358 A | 6/2019 |
| TW | 201237666 A1 | 9/2012 |
| TW | 1664634 B | 7/2019 |
| TW | 201926059 A | 7/2019 |
| TW | 201928687 A | 7/2019 |
| TW | 201947414 A | 12/2019 |
| TW | 202009695 A | 3/2020 |
| TW | 202011187 A | 3/2020 |

* cited by examiner

METHOD AND NON-TRANSITORY COMPUTER-READABLE STORAGE MEDIUM AND APPARATUS FOR PROGRAMMING DATA INTO FLASH MEMORY THROUGH DEDICATED ACCELERATION HARDWARE

CROSS-REFERENCE TO RELATED APPLICATIONS

This application claims the benefit of priority to U.S. Provisional Application Ser. No. 63/249,702, filed on Sep. 29, 2021; and Patent Application No. 202210338471.8, filed in China on Apr. 1, 2022; the entirety of which is incorporated herein by reference for all purposes.

BACKGROUND

The disclosure generally relates to storage devices and, more particularly, to a method, a non-transitory computer-readable storage medium and an apparatus for programming data into flash memory.

Flash memory devices typically include NOR flash devices and NAND flash devices. NOR flash devices are random access-a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Improving the performance of data programming into the flash modules has always been an important issue affecting the overall system performance of the flash controller. Thus, it is desirable to have a method, a non-transitory computer-readable storage medium and an apparatus for programming data into flash memory to improve data programming performance.

SUMMARY

In an aspect of the invention, an embodiment introduces a method, performed by a primary processing unit of a flash controller, for programming data into flash memory to include: generating a front-end parameter set, a mid-end parameter set and a back-end parameter set for each data-programming transaction; transmitting the front-end parameter set of each data-programming transaction to a routing engine, thereby enabling the routing engine to drive a host interface (I/F) to obtain from the host side; transmitting the mid-end parameter set of each data-programming transaction to an accelerator, thereby enabling the accelerator to drive the redundant array of independent disks (RAID) engine to encrypt raw data or generate parity-page data according to multiple pages of the raw data; and transmitting the back-end parameter set of each data-programming transaction to the accelerator, thereby enabling the accelerator to drive a data access engine to program source data into a designated physical address of a flash module.

In another aspect of the invention, an embodiment introduces a non-transitory computer-readable storage medium for programming data into flash memory. The non-transitory computer-readable storage medium includes program code when loaded and executed by a primary processing unit of a flash controller to realize the method described above.

In still another aspect of the invention, an embodiment introduces an apparatus for programming data into flash memory to include: a routing engine, an accelerator; and a primary processing unit. The primary processing unit is arranged operably to: generate a front-end parameter set, a mid-end parameter set and a back-end parameter set for each data-programming transaction; transmit the front-end parameter set of each data-programming transaction to a routing engine, thereby enabling the routing engine to drive a host I/F to obtain from the host side; transmit the mid-end parameter set of each data-programming transaction to an accelerator, thereby enabling the accelerator to drive the RAID engine to encrypt raw data or generate parity-page data according to multiple pages of the raw data; and transmit the back-end parameter set of each data-programming transaction to the accelerator, thereby enabling the accelerator to drive a data access engine to program source data into a designated physical address of a flash module.

Both the foregoing general description and the following detailed description are examples and explanatory only, and are not restrictive of the invention as claimed.

DETAILED DESCRIPTION

Figure 1:
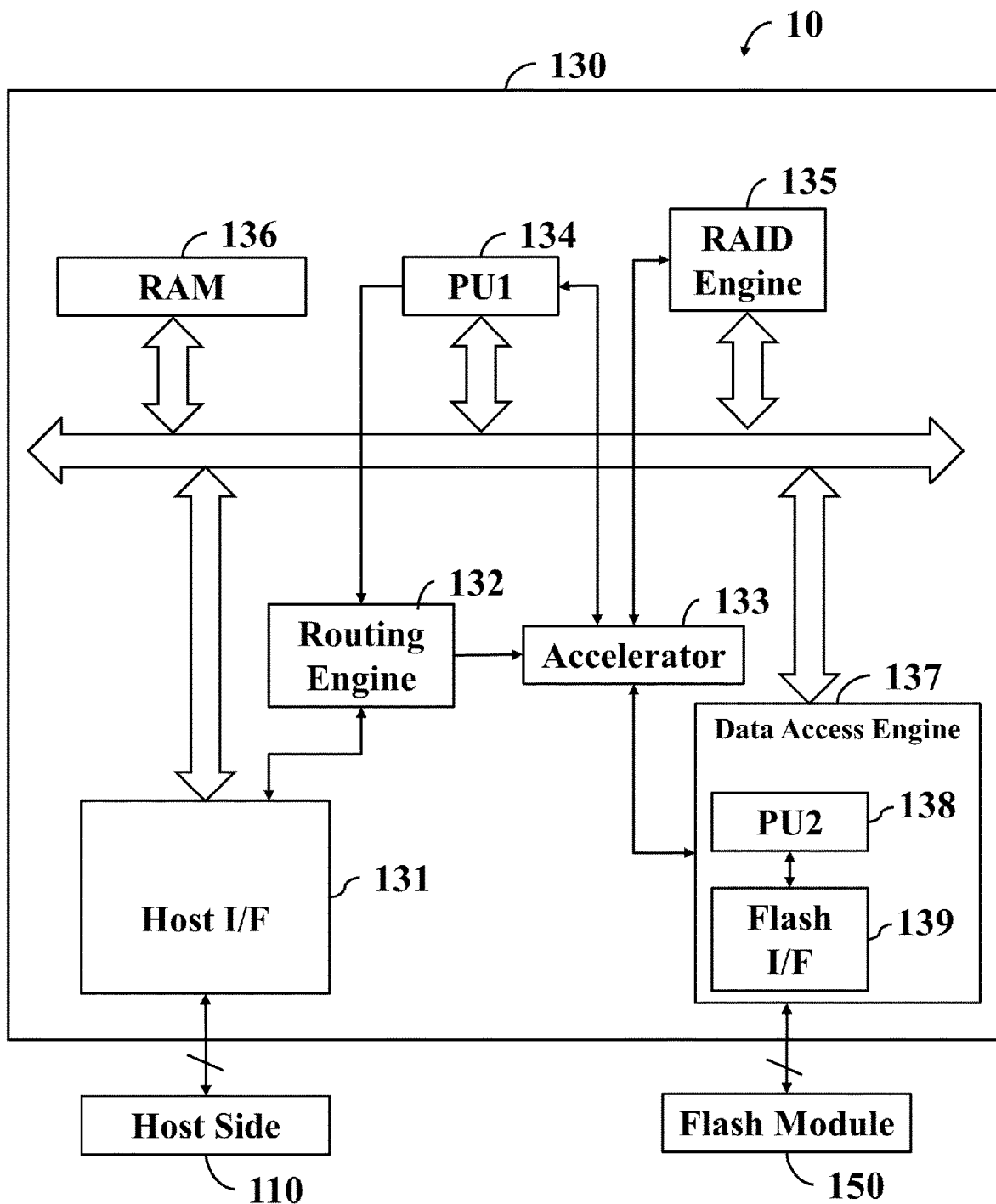
FIG. 1 is the system architecture of an electronic apparatus according to an embodiment of the invention.

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

In the flash controller, the entire data flow for programming data may be divided into three processing stages: front-end; mid-end; and back-end. The front-end processing stage is responsible for obtaining data to be programmed, in which includes information about the source address of data, the data length, the location temporarily storing the data in the Static Random Access Memory (SRAM), etc. The mid-end processing stage involves data security, including data reordering, and coordination with the RAID engine to perform such as data encryption, parity page generation, etc. The back-end processing stage includes obtaining data from the SRAM, post-operations (including such as data scrambling, appending low-density parity-check (LDPC) code to data, etc.), control of physical data-programming, and so on. It is to be understood that the system may ignore any one or two of the above three stages depending on the different characteristics of data programming. In some implementations, the flash controller when executing a host write command usually uses firmware (also referred to as Firmware Translation Layer, FTL) to activate, control and supervise the data flow, so that it consumers large of processor loading and computing resources on such tasks. Specifically, the firmware would consume excessive time and computing resources to check if relevant data has been stored in the designated location in the SRAM, query relevant hardware (such as the RAID engine, the flash I/F, etc.), wait for the replies to know the operating statuses, and so on. To address the problems described above, an embodiment of the invention modifies the current architecture to set dedicated hardware circuits that can be matched with the firmware to speed up the overall processing of data programming.

Refer to FIG. 1. The electronic apparatus 10 includes a host side 110, a flash controller 130 and a flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and a host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. A flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes a first processing unit 134 and the first processing unit 134 (also referred to as the primary processing unit) may be implemented in numerous ways, such as with general-purpose hardware (e.g., a single processor, multiple processors or graphics processing units capable of parallel computations, or others) that is programmed using firmware and/or software instructions to perform the functions recited herein. The first processing unit 134 receives host commands, such as host read, write, trim, erase commands, through the host I/F 131, schedules and executes these commands. The flash controller 130 includes a Random Access Memory (RAM) 136 and the RAM 136 may be implemented in a Dynamic Random Access Memory (DRAI), a Static Random Access Memory (SRAM), or the combination thereof, for allocating space as a data buffer storing user data (also referred to as host data) that is to be programmed into the flash module 150, and has been read from the flash module 150 and is to be output to the host side 110. The RAM 136 stores necessary data in execution, such as variables, data tables, data abstracts, host-to-flash (H2F) tables, flash-to-host (F2H) tables, and so on.

A shared bus architecture may be configured in the flash controller 130 for coupling between components to transfer data, addresses, control signals, etc., which include the host I/F 131, the first processing unit 134, the redundant array of independent disks (RAID) engine 135, the RAM 136, the data access engine 137, and so on. The bus includes a set of parallel physical-wires connected to two or more components of the flash controller 130. The bus is a shared transmission medium so that only two devices can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

A dedicated bus, which is independent from the shared bus architecture, may be further configured in the flash controller 130 for coupling between components to transfer data, addresses, control signals, etc., which include the first processing unit 134, the routing engine 132 and the accelerator 133. The routing engine 132 is employed to complete the tasks of front-end processing stage, and the accelerator 133 is employed to complete the tasks of mid-end and back-end processing stages. The routing engine 132 and the accelerator 133 may not be coupled to the shared bus architecture, so as to avoid occupying the bandwidth of the shared bus architecture, which reduces the overall system performance.

The flash module 150 provides huge storage space typically in hundred Gigabytes (GB), or even several Terabytes (TB), for storing a wide range of user data, such as high-resolution images, video files, etc. The flash module 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The first processing unit 134 programs user data into a designated address (a destination address) of the flash module 150 and reads user data from a designated address (a source address) thereof through the flash I/F 139. The flash I/F 139 may use several electronic signals run on physical wires including data lines, a clock signal line and control signal lines for coordinating the command, address and data transfer with the flash module 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
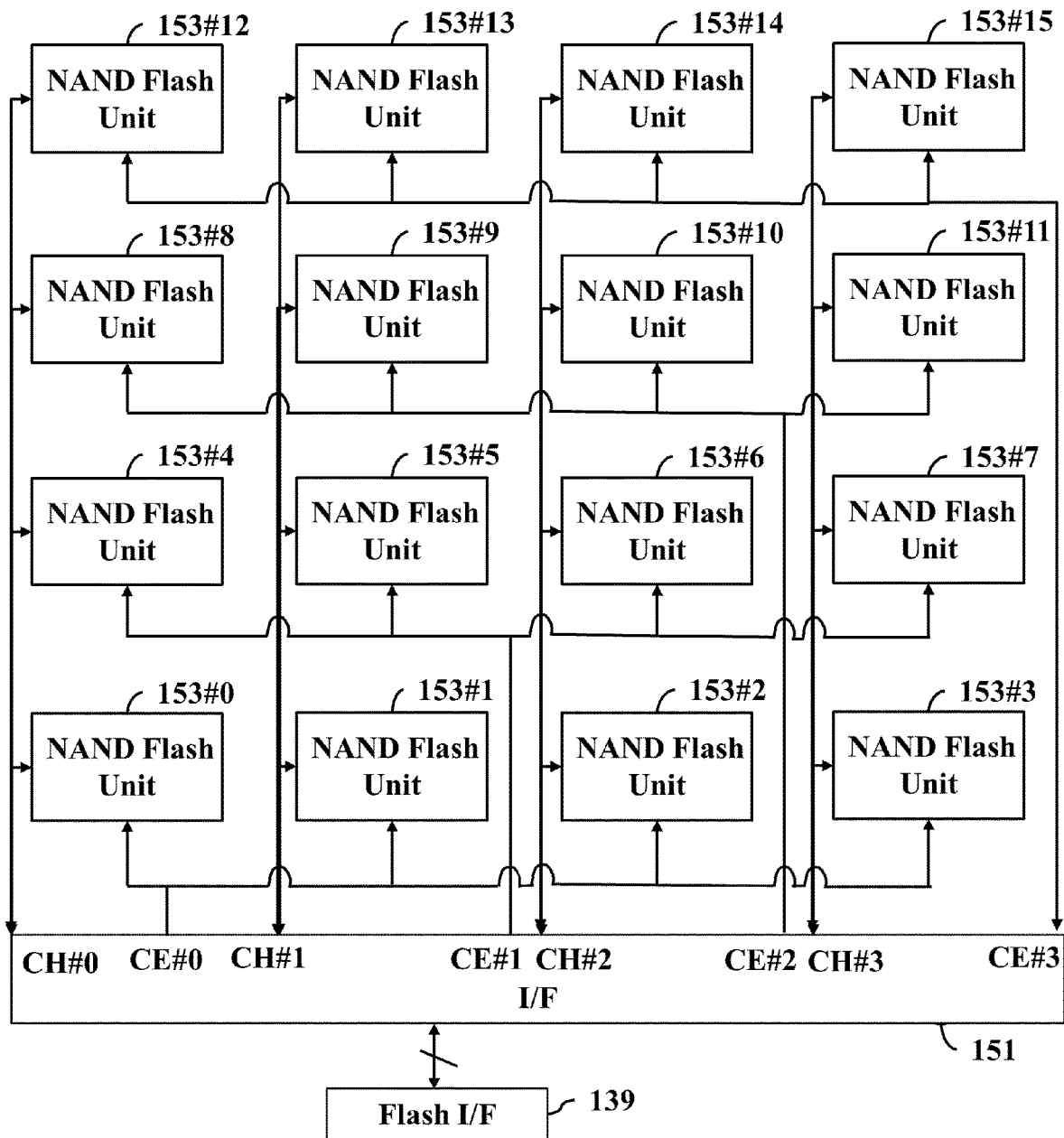
FIG. 2 is a schematic diagram illustrating a flash module according to an embodiment of the invention.

Refer to FIG. 2. The flash I/F 151 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
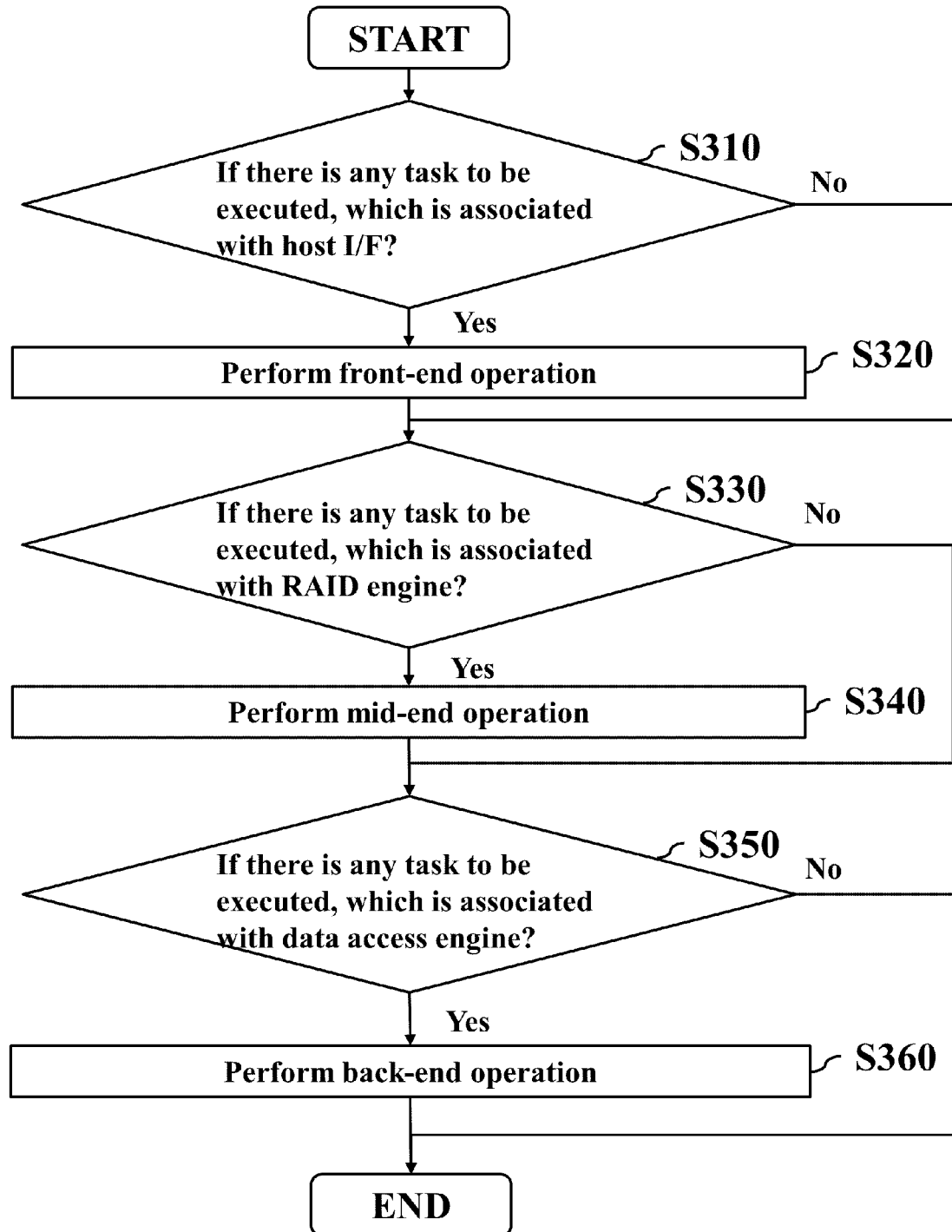
FIG. 3 is a flowchart illustrating a method for programming data according to an embodiment of the invention.

Refer to FIG. 3 showing a flowchart for programming data. In the front-end processing stage, the operation settings are checked to determine whether there is any task to be executed, which is associated with the host I/F 131 (step S310). If so (the "Yes" path of step S310), the host I/F 131 is driven to obtain data from the host side 110 and store the obtained data in the designated address in the RAM 136 (step S320). Otherwise (the "No" path of step S310), the process proceeds to the next stage (that is, the mid-end processing stage) (step S330). In the mid-end processing stage, the operation settings are checked to determine whether there is any task to be executed, which is associated with the RAID engine 135 (step S330). If so (the "Yes" path of step S330), the RAID engine 135 is driven to read data from the designated address in the RAM 136, encrypt the re-ordered data of a data group (or generate data of a parity page according to the re-ordered data of a data group), and store the encrypted data (or the parity-page data) in the designated address in the RAM 136 (step S340). Otherwise (the "No" path of step S330), the process proceeds to the next stage (that is, the back-end processing stage) (step S350). In the back-end processing stage, the operation settings are checked to determine whether there is any task to be executed, which is associated with the data access engine 137 (step S350). If so (the "Yes" path of step S350), the data access engine 137 is driven to read data from the designated address in the RAM 136, which may be the data obtained from the host side 110, the encrypted data or parity-page data generated by the RAID engine 135, etc. Moreover, the data access engine 137 is driven to perform post-operations on the read data, such as scramble the read data, append LDPC code to the read data, etc. (step S360). Otherwise (the "No" path of step S350), the process ends.

In some implementations, the first processing unit 134 is normally used to execute firmware to activate, control and supervise the whole data flow of data programming. In order to reduce the occupation of the time and computing resources of the first processing unit 134, in an embodiment of the invention, the flash controller 130 is equipped with the routing engine 132 and the accelerator 133 implemented by dedicated circuits, so that the first processing unit 134 would selectively activate the routing engine 132, the accelerator 133 and the second processing unit 138 through a control protocol, and the execution of the whole data flow would be chained by the routing engine 132, the accelerator 133 and the second processing unit 138 themselves without further instruction by the first processing unit 134. Moreover, the control protocol would selectively ignore one or two processing stages in the whole data flow in terms of the characteristics of different data programming processes.

Figure 4:
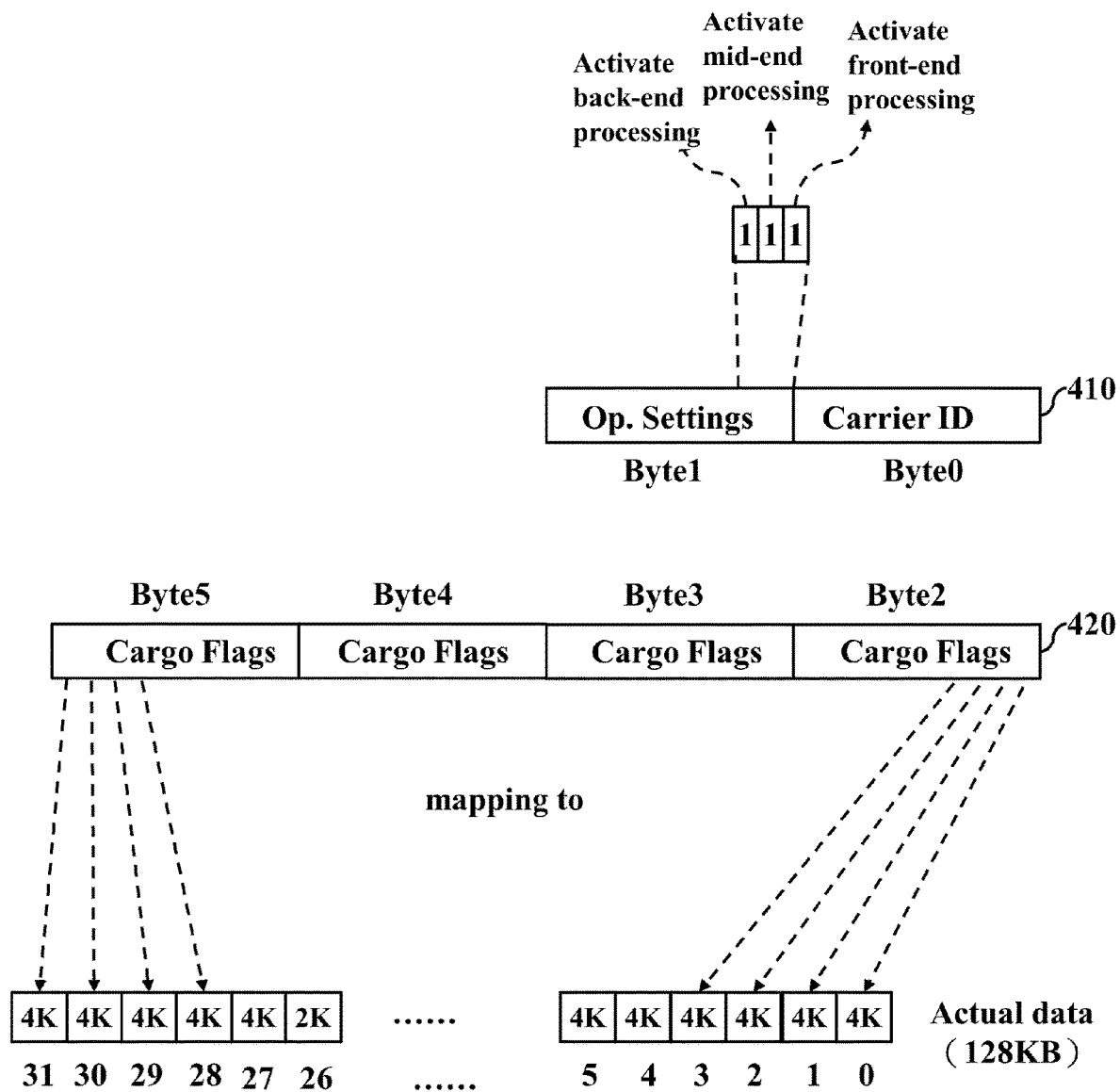
FIG. 4 is a schematic diagram illustrating a transaction profiles according to an embodiment of the invention.

An embodiment of the invention proposes to handle the whole data flow of data programming in a transaction-by-transaction manner, so that the data to be programmed flows through certain designated hardware for processing. In order to let the routing engine 132, the accelerator 133 and the second processing unit 138 know the transaction profile of data programming, an embodiment of the invention allows the first processing unit 134 to generate leading information and cargo flags and transmit them to the routing engine 132 and the accelerator 133 to inform the routing engine 132, the accelerator 133 and the second processing unit 138 such as which carrier the data in each transaction (also referred to as a data-programming transaction) to be programmed belongs to, the readiness status of each cargo in this carrier, which processing stages the carrier needs to go through, etc., so that the execution between the routing engine 132, the accelerator 133 and the second processing unit 138 for each transaction is coordinated. Refer to FIG. 4 showing a schematic diagram of the transaction profile including the two-byte leading information (Byte0-Byte1) 410, the four-byte cargo flags (Byte2-Byte5) 420. Assuming that programming 128 KB of data to the flash module 150 at a time would yield better performance: the flash controller 130 drives the data access engine to program 128 KB of data into multiple NAND flash units in the flash module 150 in the multi-channel interleave manner. According to the above example, the $0^{th}$ byte (Byte0) of the leading information 410 stores the carrier identification (ID), which is used to indicate the specific 128 KB data. The $1^{st}$ byte (Byte1) of the leading information 410 stores information about operation settings, in which the least three significant bits store information indicating which processing stage/stages is/are activated. For example, the least three significant bits being "0b111" indicate that all the front-end, the mid-end and the back-end processing stages are activated. By providing the carrier ID, the 128 K data with the same carrier ID seems to be loaded on the same virtual carrier, cooperating with each belonging transaction to be processed between the routing engine 132 and the accelerator 133. It is to be noted that a virtual carrier may load data of a specific length according to a particular type of flash module, such as 16 KB, 32 KB, 64 KB, or others. Since one transaction may not be used to supervise the data programming for the whole 128 KB of data, each bit in the cargo flags 420 is employed to indicate whether a specific data fragment (also referred to as cargo) in the 128 KB data is ready, "1" means ready, and "0" means not yet. For example, the least two significant bits in the $2^{nd}$ byte (Byte2) being set to "0b11" indicates that the $0^{th}$ and the $1^{st}$ 4 KB of data in the whole 128 KB data are ready. The least two significant bits in the $3^{rd}$ byte (Byte3) being set to "0b11" indicates that the $8^{th}$ and the $9^{th}$ 4 KB of data in the whole 128 KB data are ready. It is to be understood that, in some system configurations, 4 KB data is referred to as one host page (including eight continuous logical block addresses, LBAs) of data.

In an example, when receiving a host write command instructing to write 128 KB of data from the host side 110 through the host I/F 131, the firmware executed by the first processing unit 134 generates the transaction profile: the carrier ID is "0x00"; the operating settings are "0x07", which indicates that the front-end, the mid-end and the back-end processing stages need to be activated for this transaction; and the cargo flags are "0x00000000" (which may be called the initial cargo flags), which indicate that no data is ready. Next, the first processing unit 134 transmits the transaction profile, the host write command, and the designated address (also referred to as the destination address) in the RAM 136 for storing the 128 KB data to the routing engine 131. The host write command may contain the following information: the operation code (Opcode), the start LBA number, the LBA length, etc. The host write command and the destination address may be collectively referred to as a front-end parameter set. Typically, one LBA indicates 512B of data and one host page holds eight continuous LBAs of data. Although the embodiments of the invention describe the length of one LBA is 512 B and one host page contains eight LBAs of data, those artisans may modify the length of one LBA to other length (such as 256 B, 1 KB, 2 KB etc.), and/or modify a host page to hold a greater or smaller number of LBAs of data according to different system requirements.

In another example, when receiving a host write command instructing to write 64 KB of data from the host side 110 through the host I/F 131, the firmware executed by the first processing unit 134 generates the transaction profile: the carrier ID is "0x01"; the operating settings are "0x07"; and the cargo flags are "0xFFFF0000" (which may be called the initial cargo flags), which indicate that data related to the $0^{th}$ to $15^{th}$ cargos is not ready, and data related to the $16^{th}$ to $31^{st}$ cargos is ready (it is also implied that the data can be ignored and do not need to be processed). Next, the first processing unit 134 transmits the transaction profile, the host write command, and the designated address in the RAM 136 for storing the 64 KB data to the routing engine 131.

In still another example, after 128 KB data has been collected in a Garbage Collection (GC) process, the firmware executed by the first processing unit 134 generates the transaction profile: the carrier ID is "0x02"; the operating settings are "0x04" to indicate that only the back-end processing stage needs to be activated; and the cargo flags are "0xFFFFFFFF" (which may be called the initial cargo flags), which indicate that all data is ready.

The first processing unit 134 transmits the initial cargo flags for each transaction to the routing engine 132 and the accelerator 133 to inform the routing engine 132 and the accelerator 133 about which portions of data related to each transaction need to be prepared in the front-end processing stage.

Before actually pushing the leading information and the front-end parameter set of a transaction into the routing engine 132, the first processing unit 134 needs to prepare the mid-end parameter set and the back-end parameter set associated with the transaction. The firmware executed by the first processing unit 134 stores the operation details of the mid-end and the back-end processing stages of up to a maximum number of transactions (e.g. 64 transactions) in the SRAM of the accelerator 133. The mid-end parameter set indicates the details of how to drive the RAID engine 135 to complete the mid-end processing stage, and may include a source address allocated in the RAM 136 for storing the raw data, the encryption or encoding parameters used to set the RAID engine 135, a destination address allocated in the RAM 136 for storing the encrypted or encoded results. The back-end parameter set indicates the details of how to drive the data access engine 137 to complete the back-end processing stage, and may include a programming table and an index of the programming table. The programming table includes an address (may be referred to as a source address) allocated in the RAM 136 for storing source data, a series of flash commands and their programming parameters (such as a command type, a programming mode, a physical address to be programed into for each flash command, etc.). The physical address (may be referred to as a destination address) may include information about a channel number, a physical-block number, a physical-page number, a section number, etc.

For the executions of host write commands or the performance of background procedures, the first processing unit 134 generates leading information, initial cargo flags, front-end parameter sets, mid-end parameter sets and back-end parameter sets for multiple transactions. After the first processing unit 134 transmits the leading information, the initial cargo flags and the front-end parameter sets for these transactions to the routing engine 132 and transmits the leading information, the initial cargo flags, the mid-end parameter sets and the back-end parameter sets for these transactions to the accelerator 133, the routing engine 132, the accelerator 133 and the data access engine 137 completes a variety of data programming processes accordingly, without the first processing unit 134 to supervise the whole data flow of the data programming processes, and wait for the status replies from the host I/F 131, the RAID engine 135 and the data access engine 137 during the data programming processes. In other words, the first processing unit 134 does not directly drive the host I/F 131, the RAID engine 135 and the data access engine 137, but employs the routing engine 132 and the accelerator 133 to drive the host I/F 131, the RAID engine 135 and the data access engine 137 to complete the operations of front-end, mid-end and back-end processing stages during the data programming processes. The saved time and computing resources allows the first processing unit 134 to perform other tasks, thereby improving the overall system performance. After that, for each transaction, the first processing unit 134 may read the execution status from the designated address in the RAM 136 or query the routing engine 132 and/or the accelerator 133 to obtain the execution status at regular time intervals.

The routing engine 132 receives the operation settings and the front-end parameter set of a transaction from the first processing unit 134, and the operation settings indicate whether each of the front-end, the mid-end and the back-end processing stages is required to be activated. When determining that the front-end processing stage is required to be activated according to the operation settings, the routing engine 132 drives the host I/F 131 to obtain data from the host side 110 and store the obtained data in the designated address of the RAM 136 through the shared bus architecture according to the front-end parameter set.

Figure 5:
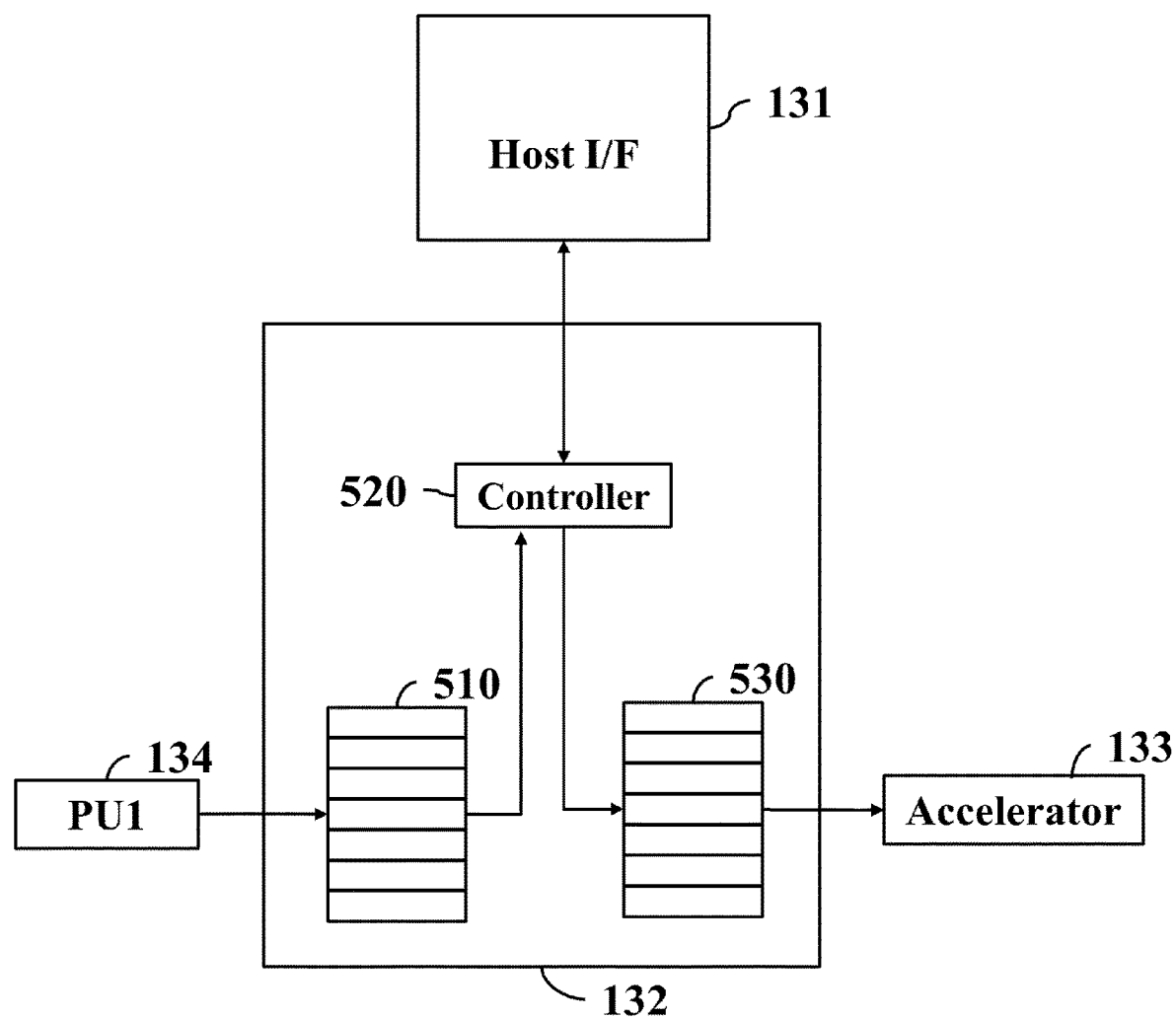
FIG. 5 is a block diagram of a routing engine according to an embodiment of the invention.

Refer to FIG. 5 showing a block diagram of the routing engine 132. The routing engine 132 includes the status queue 510, the controller 520 and the activation queue 530. The controller 520 may be practiced in a general-purpose processor or a dedicated circuit, and the status queue 510 and the activation queue 530 may be practiced in pre-allocated space in the SRAM. The routing engine 132 may perform a series of signal and data interchanges with the first processing unit 134 through the Advanced High-Performance (AHB) bus. If there is any transaction (i.e. virtual carrier) needs to obtain data from the host side 110 through the host I/F 131, the firmware executed by the first processing unit 134 pushes the transaction profile (including the initial cargo flags) and the front-end parameter set into the status queue 510 for instructing the routing engine 132 how to drive the host I/F 131 to obtain the designated data and store the data in the designated address in the RAM 136. The front-end parameter set indicates the logical address range of the host data, which may be represented by a start LBA number and an LBA length, as well as the designated location in the RAM 136 for storing the host data.

Figure 6:
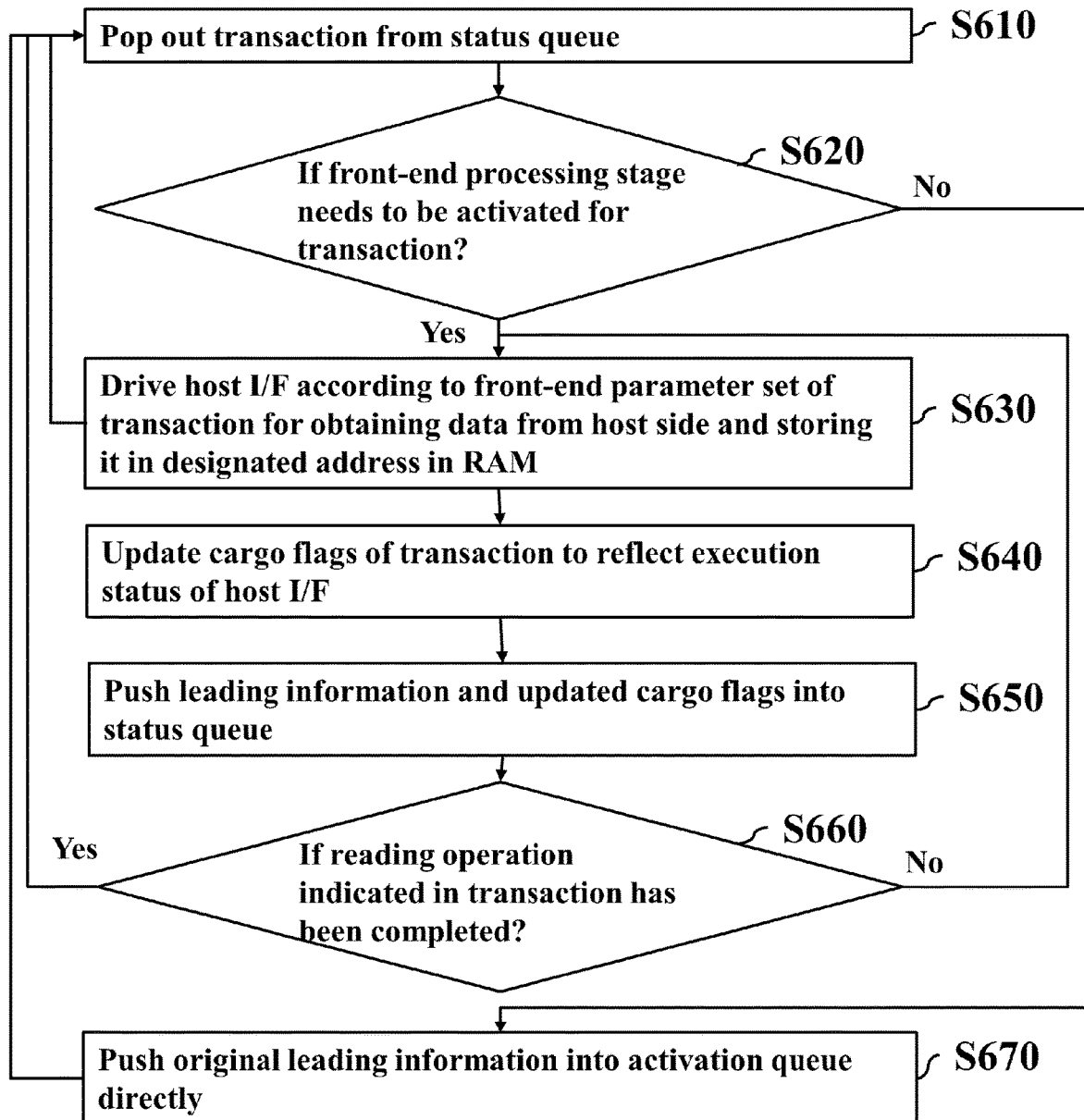
FIG. 6 is a flowchart illustrating a method for programming data in a front-end processing stage according to an embodiment of the invention.

Refer also to FIG. 6 showing a flowchart of the method for performing the front-end processing stage by the controller 520. The method iteratively executes an outer loop (from steps S610 to S670) and an inner loop (from steps S630 to S660). Each iteration of the outer loop starts with the controller 520 popping out a transaction from the status queue 510 (step S610), and then determining whether the data related to the transaction needs to go through the front-end processing stage according to the operation settings of the transaction (step S620). If so (the "Yes" path of step S620), the inner loop is started for driving (or activating) the host I/F 131 to obtain the host data of the designated address from the host side 110 and storing the obtained host data in the designated address in the RAM 136 according to the content of transaction (step S630). It is to be understood that, for better performance, the processing order of the queued transactions may not be consistent with the time order in which they arrive to the statues queue 510. That is, a transaction that arrives in the status queue 510 earlier is not necessarily processed by the controller 520 earlier. In other words, while the controller 520 drives the host I/F 131 to complete the operation indicated by a transaction's front-end parameter set, the status queue 510 may store an earlier arriving transaction that has not yet been processed.

Since the controller 520 may complete the acquisition of the host data related to one transaction in multiple batches, each time after any host page (or any LBA range) of host data has been successfully stored in the designated address in the RAM 136 (step S630), the controller 520 updates the cargo flags to reflect the execution status of the host I/F 131 (step S640), and pushing the leading information and the updated cargo flags into the activation queue 530, so that the accelerator 133 determines whether to activate the subsequent processing stage accordingly (step S650). For example, the popped transaction records the following transaction profile: the carrier ID is "0x01"; the operation settings are "0x07"; and the cargo flags are "0xFFFF0000". The controller 520 uses two batches to drive the host I/F 131 to complete the reading of 64 KB data. After successfully performing the first batch for the 32 KB data, the controller 520 updates the cargo flags with "0xFFFF00FF", and pushes the updated transaction profile (including the carrier ID "x01"; the operation settings "0x07"; and the cargo flags "0xFFFF00FF") into the activation queue 530. After successfully performing the second batch for the 32 KB data, the controller 520 updates the cargo flags with "0xFFFFFF00", and pushes the updated transaction profile (including the carrier ID "x01"; the operation settings "0x07"; and the cargo flags "0xFFFF FF00") into the activation queue 530.

If the operation settings indicate that the data related to this transaction does not go through the front-end processing stage (the "No" path of step S620), the controller 520 pushes the original transaction profile into the activation queue directly (step S670).

Each time the controller 520 pushes the original or updated transaction profile into the activation queue 530, it may mean that the controller 520 notifies the accelerator 133 of the activation message for the corresponding transaction.

The accelerator 133 receives the operation settings, the mid-end parameter set and the back-end parameter set of a transaction from the first processing unit 134, and the operation settings indicate whether every of the front-end, the mid-end and the back-end processing stages is required to be activated. When receiving the activation message for the transaction from the routing engine 132 and determining that the mid-end processing stage needs to be activated according to the operation settings, the accelerator 133 drives the RAID engine 135 to obtain data from a designated address of the RAM 136 through the shared bus, and encrypt the obtained data or generate parity-page data in terms of multiple pages of the obtained data according to the mid-end parameter set. Subsequently, when determining that the mid-end processing stage for the transaction does not need to be activated according to the operation settings or has been completed, and the back-end processing stage needs to be activated for the transaction according to the operation settings, the accelerator 133 drives the data access engine 137 according to the back-end parameter set to obtain data from a designated address of the RAM 136 through the shared bus and program the obtained data into a designated address of the flash module 150.

Figure 7:
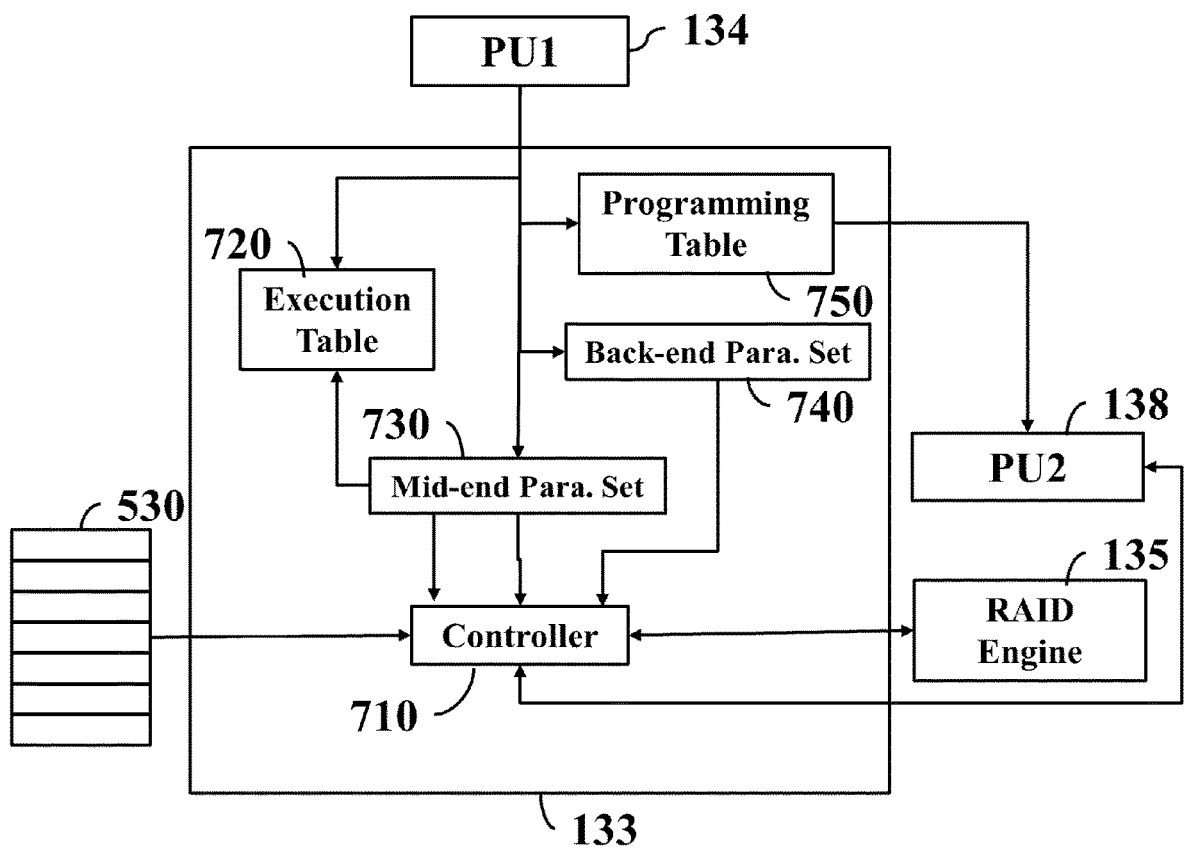
FIG. 7 is a block diagram of an accelerator according to an embodiment of the invention.

Refer to FIG. 7 showing a block diagram of the accelerator 133. The accelerator 133 includes the controller 710, the execution table 720, the mid-end parameter set 730, the back-end parameter set 740 and the programming table 750. The controller 710 may be practiced in a general-purpose processor or a dedicated circuit, and the execution table 720, the mid-end parameter set 730, the back-end parameter set 740 and the programming table 750 may be practiced in pre-allocated space in the SRAM. The accelerator 133 may perform a series of signal and data interchanges with the first processing unit 134 through the AHB bus. The execution table 720 stores transaction profiles for multiple transactions (i.e. virtual carriers), and the content of execution table 720 is filled by the first processing unit 134. An example of the execution table 720 is shown in Table 1:

TABLE 1

| Entry No. | Leading Information | Cargo Flags |
|---|---|---|
| entry#0 | leadInfo#10 | cargoFlag#10 |
| entry#1 | leadInfo#11 | cargoFlag#11 |
| entry#2 | leadInfo#12 | cargoFlag#12 |
| entry#3 | leadInfo#13 | cargoFlag#13 |
| . | . | . |
| . | . | . |
| . | . | . |
| entry#62 | N/A | N/A |
| entry#63 | N/A | N/A |

The first processing unit 134 sequentially fills in the transaction profiles (including the leading information and the cargo flags) according to the execution sequence of the transactions. For example, the first processing unit 134 sequentially fills the $10^{th}$ to $13^{th}$ transaction profiles into the $0^{th}$ to $3^{rd}$ entries (entry #0 to entry #3) in the execution table 720, respectively. The transaction profile of the $10^{th}$ transaction includes the corresponding leading information (leadInfo #10) and the corresponding cargo flags (cargoFlag #10), the transaction profile of the $11^{th}$ transaction includes the corresponding leading information (leadInfo #11) and the corresponding cargo flags (cargoFlag #11), and so on. Although the order in which the transactions are pushed in the activation queue 530 is not necessarily the order that the first processing unit 134 originally pushes them into the status queue 510, the controller 710 executes the transactions in the order arranged in the execution table 720. That is, the controller 710 cannot drive the RAID engine 135 and the data access engine 137 for any of the $11^{th}$ to $13^{th}$ transactions if the mid-end processing stage and/or the back-end processing stage required for the $10^{th}$ transaction has not been completed.

If there is any transaction that needs to be processed by the RAID engine 135, the first processing unit 134 stores the corresponding mid-end parameter set 730 in a designated address in the SRAM of the accelerator 133 in advance, so that the controller 710 sets the RAID engine 135 accordingly to complete the mid-end processing stage for this transaction. If there is any transaction that needs to be processed by the data access engine 137, the first processing unit 134 stores the corresponding back-end parameter set 740 and the corresponding programming table 750 in a designated address in the SRAM of the accelerator 133 in advance, so that the second processing unit 138 in the data access engine 137 drives the flash I/F 139 accordingly to complete the back-end processing stage for this transaction.

Figure 8:
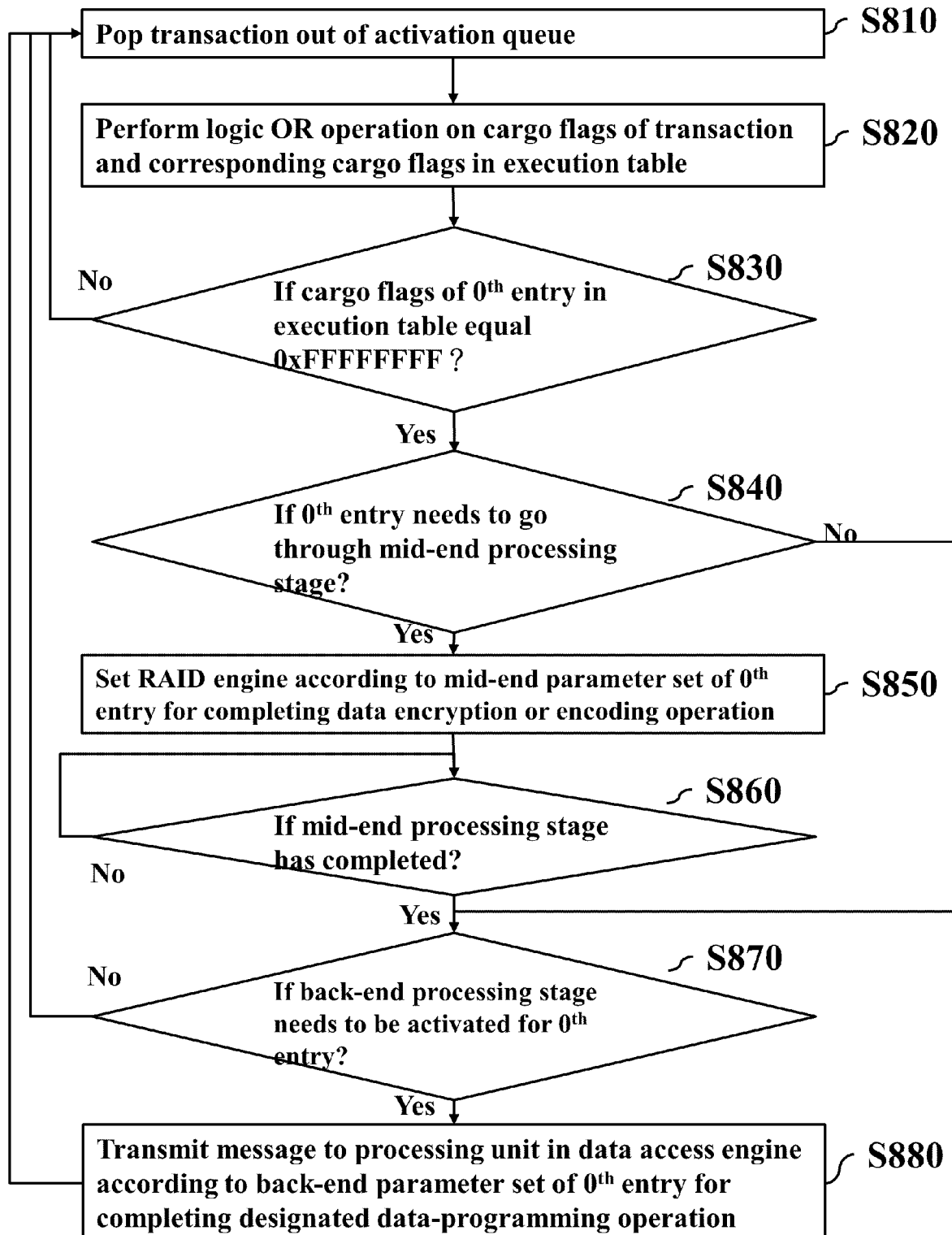
FIG. 8 is a flowchart illustrating a method for programming data in a mid-end processing stage and a back-end processing stage according to an embodiment of the invention.

Refer also to FIG. 8 showing a flowchart of the method for performing the front-end processing stage by the controller 710. The method iteratively executes a loop (from steps S810 to S880). Each iteration of the loop starts with the controller 710 popping out a transaction from the activation queue 530 (step S810), performing logic OR operation on the cargo flags of the popped transaction and the corresponding cargo flags in the execution table 720 and updating the calculation results with the corresponding cargo flags in the execution table 720 (step S820), and determining whether the cargo flags of the $0^{th}$ entry equal "0xFFFFFFFF" (step S830). If so (the "Yes" path of step S830), it means that the front-end processing stage for the $0^{th}$ entry has completed or there is no need to perform the front-end processing stage for the $0^{th}$ entry, and the $0^{th}$ entry in the execution table 720 goes through the mid-end processing stage (steps S840 to S860). Otherwise (the "No" path of step S830), it means that the front-end processing stage for the $0^{th}$ entry has not completed, the controller 710 pops the next transaction out of the activation queue 530 to process (step S810).

For example, assume that the execution table stores two transactions. At the time point t0, the $0^{th}$ entry includes the transaction profile: the carrier ID is "0x10"; operation settings are "0x07"; and the cargo flags are "0x00000000". The $1^{st}$ entry includes the transaction profile: the carrier ID is "0x11"; operation settings are "0x07"; and the cargo flags are "0x00000000".

At the time point t1, the controller 710 pops one transaction out of the activation queue 530, which includes the following transaction profile: the carrier ID "0x10"; the operation settings "0x07"; and the cargo flags "0x0000FFFF" (step S810). The controller 710 performs the logical OR operation on the cargo flags "0x0000FFFF" of the popped transaction and the corresponding cargo flags "0x00000000" (i.e. the cargo flags of the $0^{th}$ entry) in the execution table 720, and updates the corresponding cargo flags in the execution table 720 with the calculation result "0x0000FFFF" (step S820). Since the cargo flags "0x0000FFFF" of the $0^{th}$ entry in the execution table 720 does not equal 0xFFFFFFFF (the "No" path of step S830), the process cannot be executed downward.

At the time point t2, the controller 710 pops one transaction out of the activation queue 530, which includes the following transaction profile: the carrier ID "0x11"; the operation settings "0x07"; and the cargo flags "0xFFFFFFFF" (step S810). The controller 710 performs the logical OR operation on the cargo flags "0xFFFFFFFF" of the popped transaction and the corresponding cargo flags "0x00000000" (i.e. the cargo flags of the $1^{st}$ entry) in the execution table 720, and updates the corresponding cargo flags in the execution table 720 with the calculation result "0xFFFFFFFF" (step S820). Since the cargo flags "0x0000FFFF" of the $0^{th}$ entry in the execution table 720 is still not equal to 0xFFFFFFFF (the "No" path of step S830), even if the $1^{st}$ entry is ready, the process cannot be executed downward.

At the time point t3, the controller 710 pops one transaction out of the activation queue 530, which includes the following transaction profile: the carrier ID "0x10"; the operation settings "0x07"; and the cargo flags "0xFFFF0000" (step S810). The controller 710 performs the logical OR operation on the cargo flags "0xFFFF0000" of the popped transaction and the corresponding cargo flags "0x0000FFFF" (i.e. the cargo flags of the $0^{th}$ entry) in the execution table 720, and updates the corresponding cargo flags in the execution table 720 with the calculation result "0xFFFFFFFF" (step S820). Since the cargo flags "0xFFFFFFFF" of the $0^{th}$ entry in the execution table 720 equals 0xFFFFFFFF (the "Yes" path of step S830), the process proceeds to the mid-end processing stage for the $0^{th}$ entry (steps S840 to S860). It is to be noted that, after completing the back-end processing stage for $0^{th}$ entry, the controller 710 deletes the data of the $0^{th}$ entry in the execution table 720 and moves the data of the $1^{st}$ entry and the subsequent entries in the execution table 720 forward by one entry. That is, the $0^{th}$ entry of the updated execution table 720 includes the following transaction profile: the carrier ID "0x11"; the operation settings "0x07"; and the cargo flags "0xFFFFFFFF".

At the beginning of mid-end processing stage, the controller 710 determines whether the data corresponding to the $0^{th}$ entry in the execution table 720 needs to go through the mid-end processing stage according to the operations settings of the $0^{th}$ entry (step S840). If so (the "Yes" path of step S840), the controller 710 sets the RAID engine 135 according to the mid-end parameter set of the $0^{th}$ entry for driving the RAID engine 135 to complete a designated data encryption or encoding operation for the data corresponding to the $0^{th}$ entry (step S850). Since the encoding by the RAID engine 135 takes a period of time, the controller 710 may send polls to the RAID engine 135 at regular time intervals, and determine whether the mid-end processing stage is completed according to the replied statuses (step S860). If the mid-end processing stage hasn't been completed (the "No" path of step S860), the controller 710 continues to wait and poll. If the mid-end processing stage has been completed (the "Yes" path of step S860), the process proceeds to the next stage (i.e. the back-end processing stage) (steps S870 and S880). Moreover, if the data corresponding to the $0^{th}$ entry in the execution table 720 does not need to go through the mid-end processing stage (the "No" path of step S840), the process proceeds to the next stage directly (steps S870 and S880).

The RAID engine 135 may perform a variety of procedures, such as clear and encode, encode, terminate encode, terminate, resume, etc., according to the instructions issued by the accelerator 133. When receiving the clear and encode instruction, the controller in the RAID engine 135 reads data of multiple host pages (such as 32 host pages) from a designated address (also called source address) in the RAM 136 through the shared bus, and overwrites the data stored in the SRAM of the RAID engine 135 with the read data. When receiving the encode instruction, the controller in the RAID engine 135 reads data of multiple host pages from a designated address in the RAM 136 through the shared bus, performs the logical Exclusive-OR (XOR) operation on the read data, and the data and stored in the SRAM of the RAID engine 135, and overwrites the data stored in the SRAM of the RAID engine 135 with the calculated result. When receiving the terminate encode instruction, the controller in the RAID engine 135 reads data of multiple host pages from a designated address in the RAM 136 through the shared bus, performs the logical XOR operation on the read data, and the data and stored in the SRAM of the RAID engine 135, overwrites the data stored in the SRAM of the RAID engine 135 with the calculated result, and store the calculated result in a designated address (also called destination address) in the RAM 136 through the shared bus.

For example, the first processing unit 134 may store 64 transactions (the carrier ID are "0x20" to "0x5F") in the execution table. The mid-end parameter set 730 of the $0^{th}$ entry includes the clear and encode instruction, the mid-end parameter sets 730 of the $1^{st}$ to $62^{th}$ entries include the encode instructions, and the mid-end parameter sets 730 of the $63^{th}$ entry includes the terminate encode instruction. Thus, the first processing unit 134 may drive the RAID engine 135 to execute the instructions in these 64 entries to obtain parity-page data corresponding to the host data.

At the beginning of back-end processing stage, the controller 710 determines whether the data corresponding to the $0^{th}$ entry in the execution table 720 needs to go through the back-end processing stage according to the operations settings of the $0^{th}$ entry (step S870). If so (the "Yes" path of step S870), the controller 710 transmits a message to the second processing unit 138 for completing a designated data-programming operation according to the back-end parameter set associated with the $0^{th}$ entry (step S880). If the data corresponding to the $0^{th}$ entry in the execution table 720 does not need to go through the back-end processing stage (the "No" path of step S870), the process continues to pop the next transaction out of the activation queue 530 to process (step S810).

The message sent from the controller 710 to the second processing unit 138 includes a programming index and a source address, the programming index indicates a designated address in the SRAM of the accelerator 133, and the source address indicates data stored in the RAM 136, which is to be programmed into the flash module 150. The second processing unit 138 reads data from the source address in the RAM 136 through the shared bus, reads the programming table 750 corresponding to the $0^{th}$ entry from the SRAM of the accelerator 133 according to the programming index, and drives the flash I/F 139 according to flash commands with programming parameters in the read programming table 750 for programming the read data into designated physical address in the flash module 150.

It is to be noted that the first processing unit 134 may be configured to handle the critical operations of the flash controller 130, such as system booting, system off, execution scheduling for a variety of host commands, sudden power-of recovery (SPOR), etc., and the second processing unit 138 may be configured to interact with the flash module 150, which includes driving the flash I/F 139 to read data from a designated address in the flash module 150, program data into a designated address in the flash module 150, erase a designated physical block in the flash module 150, etc.

The aforementioned design makes the whole system flexibly configure the data flow. For example, Table 2 shows that the data programming of the four transactions needs to go through the front-end, the mid-end and the back-end processing stages, which are arranged into a pipeline of parallel execution.

TABLE 2

| Time Point | Carrier#0 | Carrier#1 | Carrier#2 | Carrier#3 |
|---|---|---|---|---|
| t0 | Front-end | | | |
| t1 | Mid-end | Front-end | | |
| t2 | Back-end | Mid-end | Front-end | |
| t3 | | Back-end | Mid-end | Front-end |
| t4 | | | Back-end | Mid-end |
| t5 | | | | Back-end |

Table 3 shows the data programming for the data corresponding to the $0^{th}$ to $2^{nd}$ entries needs to go through the front-end and the mid-end processing stages, the data programming for the data corresponding to the $3^{rd}$ entry needs to go through the front-end, the mid-end and the back-end processing stages, which are arranged into a pipeline of parallel execution.

TABLE 3

| Time Point | Carrier#0 | Carrier#1 | Carrier#2 | Carrier#3 |
|---|---|---|---|---|
| t0 | Front-end | | | |
| t1 | Mid-end | Front-end | | |
| t2 | | Mid-end | Front-end | |
| t3 | | | Mid-end | Front-end |
| t4 | | | | Mid-end |
| t5 | | | | Back-end |

Table 4 shows the data programming for the data corresponding to the $0^{th}$ to $1^{st}$ entries needs to go through the front-end and the mid-end processing stages, the data programming for the data corresponding to the $2^{nd}$ entry needs to go through the mid-end processing stage, and the data programming for the data corresponding to the $3^{rd}$ entry needs to go through the mid-end and the back-end processing stages, which are arranged into a pipeline of parallel execution.

TABLE 4

| Time Point | Carrier#0 | Carrier#1 | Carrier#2 | Carrier#3 |
|---|---|---|---|---|
| t0 | Front-end | | | |
| t1 | Mid-end | Front-end | | |
| t2 | | Mid-end | | |
| t3 | | | Mid-end | |
| t4 | | | | Mid-end |
| t5 | | | | Back-end |

Table 5 shows the data programming for the data corresponding to the $0^{th}$ to $2^{nd}$ entries needs to go through the front-end processing stage, and the data programming for the data corresponding to the $3^{rd}$ entry needs to go through the front-end and the mid-end processing stages, which are arranged into a pipeline of parallel execution.

TABLE 5

| Time Point | Carrier#0 | Carrier#1 | Carrier#2 | Carrier#3 |
|---|---|---|---|---|
| t0 | Front-end | | | |
| t1 | | Front-end | | |
| t2 | | | Front-end | |
| t3 | | | | Front-end |
| t4 | | | | Mid-end |

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1, 2, 5, and 7, it should be noted that additional elements may be included to achieve better performance without departing from the spirit of the invention. Each element of FIGS. 1, 2, 5, and 7 is composed of various circuits and arranged operably to perform the aforementioned operations. While the process flows described in FIGS. 3, 6, and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for programming data into flash memory, performed by a primary processing unit of a flash controller, comprising:
generating a front-end parameter set, a mid-end parameter set and a back-end parameter set for each data-programming transaction, wherein the front-end parameter set comprises a host write command, and a first address allocated in a random access memory (RAM) for storing data obtained from a host side, the mid-end parameter set comprises a second address allocated in the RAM for storing raw data, a third address allocated in the RAM for storing an encrypted or encoded result, and a parameter for setting a redundant array of independent disks (RAID) engine, the back-end parameter set comprises a programming table and an index of the programming table, and the programming table comprises a fourth address allocated in the RAM for storing source data;
transmitting the front-end parameter set of each data-programming transaction to a routing engine, thereby enabling the routing engine to drive a host interface (I/F) to obtain data from the host side, and store the obtained data in the first address of the RAM according to content of the front-end parameter set;
transmitting the mid-end parameter set of each data-programming transaction to an accelerator, thereby enabling the accelerator to drive the RAID engine to obtain the raw data from the second address of the RAM, encrypt the raw data to generate the encrypted result or generate parity-page data according to multiple pages of the raw data to generate the encoded result, and store the encrypted or encoded result in the third address of the RAM according to content of the mid-end parameter set; and
transmitting the back-end parameter set of each data-programming transaction to the accelerator, thereby enabling the accelerator to drive a data access engine to obtain the source data from the fourth address of the RAM and program the source data into a designated physical address of a flash module according to content of the back-end parameter set.

2. The method of claim 1, wherein the primary processing unit does not directly drive the host I/F, the RAID engine and the data access engine during a data programming process.

3. The method of claim 1, comprising:
transmitting a carrier identification (ID) of each data-programming transaction to the routing engine and the accelerator for cooperating with each data-programming transaction to be processed between the routing engine and the accelerator.

4. The method of claim 1, comprising:
transmitting information indicating whether a front-end processing stage needs to be activated for each data-programming transaction to the routing engine, thereby enabling the routing engine to determine whether to drive the host I/F for each data-programming transaction accordingly.

5. The method of claim 4, comprising:
transmitting a plurality of initial cargo flags for each data-programming transaction to the accelerator to notify the accelerator of which portions of data for each data-programming transaction need to be completed in the front-end processing stage.

6. The method of claim 1, comprising:
transmitting information indicating whether a mid-end processing stage needs to be activated for each data-programming transaction to the accelerator, thereby enabling the accelerator to determine whether to drive the RAID engine for each data-programming transaction accordingly; and
transmitting information indicating whether a back-end processing stage needs to be activated for each data-programming transaction to the accelerator, thereby enabling the accelerator to determine whether to drive the data access engine for each data-programming transaction accordingly.

7. The method of claim 6, comprising:
storing the mid-end parameter set and the back-end parameter set of each data-programming transaction in an execution table in the accelerator in a specified order, so that the accelerator activates the mid-end processing stage and/or the back-end processing stage for each data-programming transaction in the specified order.

8. A non-transitory computer-readable storage medium for programming data into flash memory when executed by a primary processing unit of a flash controller, the non-transitory computer program product comprising program code to:
generate a front-end parameter set, a mid-end parameter set and a back-end parameter set for each data-programming transaction, wherein the front-end parameter set comprises a host write command, and a first address allocated in a random access memory (RAM) for storing data obtained from a host side, the mid-end parameter set comprises a second address allocated in the RAM for storing raw data, a third address allocated in the RAM for storing an encrypted or encoded result, and a parameter for setting a redundant array of independent disks (RAID) engine, the back-end parameter set comprises a programming table and an index of the programming table, and the programming table comprises a fourth address allocated in the RAM for storing source data;

transmit the front-end parameter set of each data-programming transaction to a routing engine, thereby enabling the routing engine to drive a host interface (I/F) to obtain data from the host side, and store the obtained data in the first address of the RAM according to content of the front-end parameter set;

transmit the mid-end parameter set of each data-programming transaction to an accelerator, thereby enabling the accelerator to drive the RAID engine to obtain the raw data from the second address of the RAM, encrypt the raw data to generate the encrypted result or generate parity-page data according to multiple pages of the raw data to generate the encoded result, and store the encrypted or encoded result in the third address of the RAM according to content of the mid-end parameter set; and transmit the back-end parameter set of each data-programming transaction to the accelerator, thereby enabling the accelerator to drive a data access engine to obtain the source data from the fourth address of the RAM and program the source data into a designated physical address of a flash module according to content of the back-end parameter set.

9. The non-transitory computer-readable storage medium of claim 8, wherein the primary processing unit does not directly drive the host I/F, the RAID engine and the data access engine during a data programming process.

10. The non-transitory computer-readable storage medium of claim 8, comprising program code to:
transmit a carrier identification (ID) of each data-programming transaction to the routing engine and the accelerator for cooperating with each data-programming transaction to be processed between the routing engine and the accelerator.

11. The non-transitory computer-readable storage medium of claim 8, comprising program code to:
transmit information indicating whether a front-end processing stage needs to be activated for each data-programming transaction to the routing engine, thereby enabling the routing engine to determine whether to drive the host I/F for each data-programming transaction accordingly;
transmit information indicating whether a mid-end processing stage needs to be activated for each data-programming transaction to the accelerator, thereby enabling the accelerator to determine whether to drive the RAID engine for each data-programming transaction accordingly; and
transmit information indicating whether a back-end processing stage needs to be activated for each data-programming transaction to the accelerator, thereby enabling the accelerator to determine whether to drive the data access engine for each data-programming transaction accordingly.

12. The non-transitory computer-readable storage medium of claim 11, comprising program code to:
store the mid-end parameter set and the back-end parameter set of each data-programming transaction in an execution table in the accelerator in a specified order, so that the accelerator activates the mid-end processing stage and/or the back-end processing stage for each data-programming transaction in the specified order.

13. The non-transitory computer-readable storage medium of claim 11, comprising program code to:
transmit a plurality of initial cargo flags for each data-programming transaction to the accelerator to notify the accelerator of which portions of data for each data-programming transaction need to be completed in the front-end processing stage.

14. An apparatus for programming data into flash memory, comprising:
a routing engine, coupled to a host interface (I/F);
an accelerator, coupled to a redundant array of independent disks (RAID) engine and a data access engine; and
a primary processing unit, coupled to the routing engine and the accelerator, arranged operably to: generate a front-end parameter set, a mid-end parameter set and a back-end parameter set for each data-programming transaction, wherein the front-end parameter set comprises a host write command, and a first address allocated in a random access memory (RAM) for storing data obtained from a host side, the mid-end parameter set comprises a second address allocated in the RAM for storing raw data, a third address allocated in the RAM for storing an encrypted or encoded result, and a parameter for setting a redundant array of independent disks (RAID) engine, the back-end parameter set comprises a programming table and an index of the programming table, and the programming table comprises a fourth address allocated in the RAM for storing source data; transmit the front-end parameter set of each data-programming transaction to the routing engine, thereby enabling the routing engine to drive a host interface (I/F) to obtain data from the host side, and store the obtained data in the first address of the RAM according to content of the front-end parameter set; transmit the mid-end parameter set of each data-programming transaction to the accelerator, thereby enabling the accelerator to drive the RAID engine to obtain the raw data from the second address of the RAM, encrypt the raw data to generate the encrypted result or generate parity-page data according to multiple pages of the raw data to generate the encoded result, and store the encrypted or encoded result in the third address of the RAM according to content of the mid-end parameter set; and transmit the back-end parameter set of each data-programming transaction to the accelerator, thereby enabling the accelerator to drive a data access engine to obtain the source data from the fourth address of the RAM and program the source data into a designated physical address of a flash module according to content of the back-end parameter set.

15. The apparatus of claim 14, wherein the primary processing unit does not directly drive the host I/F, the RAID engine and the data access engine during a data programming process.

16. The apparatus of claim 14, wherein the primary processing unit is arranged operably to: transmit a carrier identification (ID) of each data-programming transaction to the routing engine and the accelerator for cooperating with each data-programming transaction to be processed between the routing engine and the accelerator.

17. The apparatus of claim 14, wherein the primary processing unit is arranged operably to: transmit information indicating whether a front-end processing stage needs to be activated for each data-programming transaction to the routing engine, thereby enabling the routing engine to determine whether to drive the host I/F for each data-programming transaction accordingly.

18. The apparatus of claim 17, wherein the primary processing unit is arranged operably to: transmit a plurality of initial cargo flags for each data-programming transaction to the accelerator to notify the accelerator of which portions of data for each data-programming transaction need to be completed in the front-end processing stage.

19. The apparatus of claim 14, wherein the primary processing unit is arranged operably to: transmit information indicating whether a mid-end processing stage needs to be activated for each data-programming transaction to the accelerator, thereby enabling the accelerator to determine whether to drive the RAID engine for each data-programming transaction accordingly; and transmit information indicating whether a back-end processing stage needs to be activated for each data-programming transaction to the accelerator, thereby enabling the accelerator to determine whether to drive the data access engine for each data-programming transaction accordingly.

20. The apparatus of claim 19, wherein the primary processing unit is arranged operably to: store the mid-end parameter set and the back-end parameter set of each data-programming transaction in an execution table in the accelerator in a specified order, so that the accelerator activates the mid-end processing stage and/or the back-end processing stage for each data-programming transaction in the specified order.

* * * * *